United States Patent
Yamine et al.

(10) Patent No.: US 10,349,429 B1
(45) Date of Patent: Jul. 9, 2019

(54) SYSTEM AND METHOD FOR FREQUENCY REDIRECTION IN A COMMUNICATION SYSTEM

(71) Applicant: Telefonaktiebolaget LM Ericsson (publ), Stockholm (SE)

(72) Inventors: Badawi Yamine, Beirut (LB); Tomas Hedberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 15/844,583

(22) Filed: Dec. 17, 2017

(51) Int. Cl.
 *H04B 1/713* (2011.01)
 *H04W 16/14* (2009.01)
 *H04W 40/12* (2009.01)
 *H04W 72/12* (2009.01)
 *H04W 74/00* (2009.01)

(52) U.S. Cl.
 CPC ........ *H04W 72/1226* (2013.01); *H04B 1/713* (2013.01); *H04W 40/12* (2013.01); *H04W 16/14* (2013.01); *H04W 74/002* (2013.01)

(58) Field of Classification Search
 CPC ..... H04B 1/713; H04B 17/318; H04W 16/14; H04W 24/08; H04W 24/10; H04W 36/0058; H04W 36/0083; H04W 36/0085; H04W 36/0088; H04W 36/0094; H04W 36/04; H04W 36/06; H04W 36/18; H04W 36/20; H04W 36/30; H04W 36/36; H04W 40/12; H04W 40/36; H04W 72/1226; H04W 74/002
 See application file for complete search history.

(56) References Cited

U.S. PATENT DOCUMENTS

| | | | | |
|---|---|---|---|---|
| 5,038,399 A | * | 8/1991 | Bruckert | H04W 16/02 455/447 |
| 6,449,482 B1 | * | 9/2002 | Johansson | H04W 16/12 455/422.1 |
| 7,764,924 B1 | * | 7/2010 | Smithey | H04B 3/36 455/11.1 |
| 7,877,098 B2 | * | 1/2011 | Ryu | H04W 36/30 370/331 |

(Continued)

FOREIGN PATENT DOCUMENTS

| | | | | |
|---|---|---|---|---|
| CN | 101785342 B | * | 6/2013 | ........ H04W 36/0094 |
| EP | 2187671 A1 | * | 5/2010 | ........ H04W 36/0094 |

*Primary Examiner* — Eric Nowlin
(74) *Attorney, Agent, or Firm* — Boisbrun Hofman, PLLC

(57) ABSTRACT

A system and method for frequency redirection in a communication system. In one embodiment, an apparatus accesses a communication system using first system information associated with a first frequency providing a first radio measurement. The apparatus receives an instruction to evaluate at least one frequency, and performs a second radio measurement over a second frequency without reading second system information associated with the second frequency. The apparatus accesses the communication system using the second system information associated with the second frequency when the second radio measurement exceeds a threshold, and performs a third radio measurement over a third frequency when the second radio measurement is less than or equal to the threshold and without reading third system information associated with the third frequency.

20 Claims, 8 Drawing Sheets

(56) References Cited

U.S. PATENT DOCUMENTS

| | | | | |
|---|---|---|---|---|
| 8,107,964 B2* | 1/2012 | Nylander | | H04L 61/1511 |
| | | | | 455/444 |
| 8,195,219 B2* | 6/2012 | Iwamura | | H04W 36/0094 |
| | | | | 455/435.2 |
| 8,358,982 B2* | 1/2013 | Van Der Velde | | |
| | | | | H04W 36/0088 |
| | | | | 455/425 |
| 8,437,703 B2* | 5/2013 | Maeda | | H04B 17/309 |
| | | | | 455/115.1 |
| 8,554,226 B2* | 10/2013 | Laroia | | H04W 36/18 |
| | | | | 370/331 |
| 8,731,477 B2* | 5/2014 | Ekici | | H04W 24/02 |
| | | | | 370/252 |
| 8,942,205 B2* | 1/2015 | Mach | | H04W 48/20 |
| | | | | 370/252 |
| 8,948,765 B2* | 2/2015 | Kubota | | H04W 36/0083 |
| | | | | 455/442 |
| 8,995,925 B2* | 3/2015 | Ekici | | H04W 24/02 |
| | | | | 370/252 |
| 9,113,339 B2* | 8/2015 | Lunden | | H04W 52/146 |
| 9,203,563 B2* | 12/2015 | Etemad | | H04W 28/08 |
| 9,210,590 B2* | 12/2015 | Jorguseski | | H04W 24/02 |
| 9,232,503 B2* | 1/2016 | He | | H04W 72/0406 |
| 9,271,205 B2* | 2/2016 | Nory | | H04W 36/00837 |
| 9,277,467 B2* | 3/2016 | Hwang | | H04W 36/00837 |
| 9,326,168 B2* | 4/2016 | Ekici | | H04W 24/02 |
| 9,374,154 B2* | 6/2016 | Kyles | | H04B 5/02 |
| 9,398,509 B1* | 7/2016 | Braun | | H04W 36/0094 |
| 9,462,544 B2* | 10/2016 | Jorguseki | | H04W 24/02 |
| 9,467,911 B2* | 10/2016 | Somasundaram | | |
| | | | | H04M 15/7657 |
| 9,491,611 B2* | 11/2016 | Zhu | | H04W 48/16 |
| 9,510,252 B2* | 11/2016 | Kim | | H04W 48/20 |
| 9,510,261 B2* | 11/2016 | Chen | | H04W 36/18 |
| 9,515,707 B2* | 12/2016 | Kyles | | H04B 5/02 |
| 9,516,564 B2* | 12/2016 | Cui | | H04W 80/04 |
| 9,544,794 B2* | 1/2017 | Kim | | H04W 36/04 |
| 9,549,331 B2* | 1/2017 | Kim | | H04W 36/04 |
| 9,572,115 B2* | 2/2017 | Bontu | | H04L 1/0026 |
| 9,628,229 B2* | 4/2017 | Bontu | | H04L 1/0026 |
| 9,661,509 B2* | 5/2017 | Anepu | | H04W 24/10 |
| 9,749,926 B2* | 8/2017 | Muller | | H04W 36/30 |
| 9,794,837 B2* | 10/2017 | Chen | | H04W 36/18 |
| 9,807,632 B2* | 10/2017 | Kim | | H04W 36/04 |
| 9,848,362 B2* | 12/2017 | Axmon | | H04W 24/10 |
| 9,888,415 B1* | 2/2018 | Govindassamy | | |
| | | | | H04W 36/0094 |
| 9,906,346 B2* | 2/2018 | Zhao | | H04B 7/0413 |
| 10,020,680 B2* | 7/2018 | Raveh | | H02J 5/005 |
| 10,027,382 B2* | 7/2018 | Kyles | | H04B 5/02 |
| 10,070,365 B2* | 9/2018 | Alonso-Rubio | | |
| | | | | H04W 36/0022 |
| 10,070,422 B2* | 9/2018 | Yu | | H04W 72/0406 |
| 10,079,741 B2* | 9/2018 | Park | | H04W 24/00 |
| 10,080,218 B2* | 9/2018 | Yi | | H04J 11/0069 |
| 10,187,781 B2* | 1/2019 | Kumar | | H04W 8/18 |
| 10,200,919 B2* | 2/2019 | Shi | | H04W 36/0061 |
| 2007/0097938 A1* | 5/2007 | Nylander | | H04L 61/1511 |
| | | | | 370/338 |
| 2007/0097939 A1* | 5/2007 | Nylander | | H04L 61/1511 |
| | | | | 370/338 |
| 2007/0287461 A1* | 12/2007 | Ryu | | H04W 36/30 |
| | | | | 455/436 |
| 2008/0220784 A1* | 9/2008 | Somasundaram | | |
| | | | | H04W 36/0085 |
| | | | | 455/437 |
| 2008/0287130 A1* | 11/2008 | Laroia | | H04W 36/18 |
| | | | | 455/436 |
| 2008/0293419 A1* | 11/2008 | Somasundaram | | |
| | | | | H04M 15/7657 |
| | | | | 455/437 |
| 2009/0203380 A1* | 8/2009 | Park | | H04W 36/30 |
| | | | | 455/437 |
| 2010/0197300 A1* | 8/2010 | Van Der Velde | | |
| | | | | H04W 36/0088 |
| | | | | 455/425 |
| 2010/0248761 A1* | 9/2010 | Maeda | | H04B 17/309 |
| | | | | 455/500 |
| 2011/0117954 A1* | 5/2011 | Iwamura | | H04W 36/0094 |
| | | | | 455/525 |
| 2011/0319080 A1* | 12/2011 | Bienas | | H04W 36/30 |
| | | | | 455/436 |
| 2013/0053091 A1* | 2/2013 | Jorguseski | | H04W 24/02 |
| | | | | 455/524 |
| 2013/0109372 A1* | 5/2013 | Ekici | | H04W 24/10 |
| | | | | 455/422.1 |
| 2013/0150053 A1* | 6/2013 | Hwang | | H04W 36/00837 |
| | | | | 455/440 |
| 2013/0188499 A1* | 7/2013 | Mach | | H04W 48/20 |
| | | | | 370/252 |
| 2013/0188503 A1* | 7/2013 | Anepu | | H04W 24/10 |
| | | | | 370/252 |
| 2013/0196671 A1* | 8/2013 | Kubota | | H04W 36/0083 |
| | | | | 455/442 |
| 2013/0288672 A1* | 10/2013 | He | | H04W 72/0406 |
| | | | | 455/434 |
| 2013/0336290 A1* | 12/2013 | Xia | | H04W 36/14 |
| | | | | 370/332 |
| 2014/0003239 A1* | 1/2014 | Etemad | | H04W 28/08 |
| | | | | 370/235 |
| 2014/0235176 A1* | 8/2014 | Ekici | | H04W 24/10 |
| | | | | 455/67.11 |
| 2014/0295873 A1* | 10/2014 | Lunden | | H04W 52/146 |
| | | | | 455/454 |
| 2015/0016419 A1* | 1/2015 | Kim | | H04W 36/04 |
| | | | | 370/331 |
| 2015/0023192 A1* | 1/2015 | Hao | | H04W 24/04 |
| | | | | 370/252 |
| 2015/0043367 A1* | 2/2015 | Kim | | H04W 36/04 |
| | | | | 370/252 |
| 2015/0043533 A1* | 2/2015 | Kim | | H04W 48/20 |
| | | | | 370/331 |
| 2015/0055495 A1* | 2/2015 | Kim | | H04W 36/04 |
| | | | | 370/252 |
| 2015/0079981 A1* | 3/2015 | Zhu | | H04W 48/16 |
| | | | | 455/434 |
| 2015/0118968 A1* | 4/2015 | Nory | | H04W 36/00837 |
| | | | | 455/67.11 |
| 2015/0195720 A1* | 7/2015 | Ekici | | H04W 24/10 |
| | | | | 455/67.11 |
| 2015/0195763 A1* | 7/2015 | Chen | | H04W 36/18 |
| | | | | 455/436 |
| 2015/0312805 A1* | 10/2015 | Cui | | H04W 80/04 |
| | | | | 370/331 |
| 2015/0334612 A1* | 11/2015 | Ray Chaudhuri | | |
| | | | | H04W 36/0094 |
| | | | | 455/437 |
| 2016/0014666 A1* | 1/2016 | Muller | | H04W 36/30 |
| | | | | 455/436 |
| 2016/0066265 A1* | 3/2016 | Jorguseki | | H04W 24/02 |
| | | | | 455/524 |
| 2016/0149684 A1* | 5/2016 | Zhao | | H04B 7/0413 |
| | | | | 370/252 |
| 2016/0165465 A1* | 6/2016 | Park | | H04W 24/00 |
| | | | | 370/331 |
| 2016/0165471 A1* | 6/2016 | Bontu | | H04L 1/0026 |
| | | | | 370/241 |
| 2016/0181874 A1* | 6/2016 | Raveh | | H02J 5/005 |
| | | | | 307/104 |
| 2016/0198385 A1* | 7/2016 | Braun | | H04W 36/0094 |
| | | | | 455/437 |
| 2016/0205601 A1* | 7/2016 | Yiu | | H04W 4/70 |
| | | | | 455/444 |
| 2016/0219446 A1* | 7/2016 | Ekici | | H04W 24/10 |
| 2016/0248482 A1* | 8/2016 | Kyles | | H04B 5/02 |
| 2016/0254886 A1* | 9/2016 | Bontu | | H04L 1/0026 |
| | | | | 455/452.1 |
| 2016/0295489 A1* | 10/2016 | Alonso-Rubio | | |
| | | | | H04W 36/0022 |

(56) References Cited

U.S. PATENT DOCUMENTS

| | | | |
|---|---|---|---|
| 2016/0302094 A1* | 10/2016 | Yum | H04W 24/10 |
| 2016/0302109 A1* | 10/2016 | Curran | H04W 36/22 |
| 2016/0337961 A1* | 11/2016 | Hu | H04W 48/20 |
| 2016/0345221 A1* | 11/2016 | Axmon | H04W 24/10 |
| 2016/0352442 A1* | 12/2016 | Xu | H04L 5/0048 |
| 2017/0048770 A1* | 2/2017 | Somasundaram | H04M 15/7657 |
| 2017/0064588 A1* | 3/2017 | Chen | H04W 36/18 |
| 2017/0070917 A1* | 3/2017 | Cui | H04W 80/04 |
| 2017/0077997 A1* | 3/2017 | Kyles | H04B 5/02 |
| 2017/0093508 A1* | 3/2017 | Martin | H04W 24/02 |
| 2017/0126357 A1* | 5/2017 | Dalsgaard | H04B 17/309 |
| 2017/0142702 A1* | 5/2017 | Yu | H04W 72/0406 |
| 2017/0208636 A1* | 7/2017 | Agiwal | H04W 8/00 |
| 2017/0215109 A9* | 7/2017 | Curran | H04W 36/22 |
| 2017/0223667 A1* | 8/2017 | Yi | H04J 11/0069 |
| 2017/0257874 A1* | 9/2017 | Ma | H04W 48/20 |
| 2018/0020366 A1* | 1/2018 | Martin | H04B 17/318 |
| 2018/0035348 A1* | 2/2018 | Axmon | H04W 24/10 |
| 2018/0132161 A1* | 5/2018 | Lee | H04W 4/00 |
| 2018/0146410 A1* | 5/2018 | Cho | H04W 48/20 |
| 2018/0160340 A1* | 6/2018 | Shi | H04W 36/0061 |
| 2018/0192365 A1* | 7/2018 | Feng | H04W 36/16 |
| 2018/0192404 A1* | 7/2018 | Maaref | H04L 5/0044 |
| 2018/0220399 A1* | 8/2018 | Davydov | H04L 1/0026 |
| 2018/0242184 A1* | 8/2018 | Yerramalli | H04J 11/0069 |
| 2018/0242348 A1* | 8/2018 | Chendamarai Kannan | H04W 72/1268 |
| 2018/0255450 A1* | 9/2018 | Kumar | H04W 8/18 |
| 2018/0270723 A1* | 9/2018 | Kim | H04W 24/08 |
| 2018/0288715 A1* | 10/2018 | Ye | H04B 17/318 |
| 2018/0324656 A1* | 11/2018 | Chen | H04W 36/00 |
| 2018/0332573 A1* | 11/2018 | Yu | H04W 72/0406 |
| 2019/0007933 A1* | 1/2019 | Yi | H04J 11/0069 |
| 2019/0014513 A1* | 1/2019 | Yang | H04W 76/27 |
| 2019/0045403 A1* | 2/2019 | Cui | H04W 80/04 |
| 2019/0052506 A1* | 2/2019 | Jung | H04L 27/2692 |

* cited by examiner

SYSTEM AND METHOD FOR FREQUENCY REDIRECTION IN A COMMUNICATION SYSTEM

TECHNICAL FIELD

The present invention is directed, in general, to the communication systems and, more specifically, to a system and method for frequency redirection in a communication system.

BACKGROUND

The telecommunication companies generally have more than one wireless technology such as 2G, 3G (Universal Mobile Telecommunications System ("UMTS")), and 4G (Long Term Evolution ("LTE")) in the network and in the future will add more wireless technologies such as 5G. Additionally, with the introduction of carrier aggregation, the use of more than one frequency has been employed for an operator that desires to deliver a higher data throughput to the subscribers. The use of multiple frequencies may also assist with call retainability (e.g., if 5G or 4G coverage is not available, the user equipment can fallback to another frequency). In another example, the use of multiple frequencies can be used for circuit switch fallback ("CSFB") referring to fallback from one wireless technology to another wireless technology. Even with the adoption of the techniques mentioned above, what is needed in the art is continued improvement for frequency selection in a communication system.

SUMMARY

These and other problems are generally solved or circumvented, and technical advantages are generally achieved, by advantageous embodiments of the present invention for a system and method for frequency redirection in a communication system. In one embodiment, an apparatus is configured to access a communication system using first system information associated with a first frequency providing a first radio measurement. The apparatus is configured to receive an instruction to evaluate at least one frequency in accordance with a threshold and a hysteresis, and perform a second radio measurement over a second frequency without reading second system information associated with the second frequency. The apparatus is also configured to determine if the second radio measurement exceeds the threshold, access the communication system using the second system information associated with the second frequency when the second radio measurement exceeds the threshold, and perform a third radio measurement over a third frequency when the second radio measurement is less than or equal to the threshold and without reading third system information associated with the third frequency. The apparatus is also configured to determine if the third radio measurement exceeds the threshold, and access the communication system using the third system information associated with the third frequency when the third radio measurement exceeds the threshold. The apparatus is also configured to determine if the third frequency is a final frequency under evaluation when the third radio measurement is less than or equal to the threshold, and compare the third radio measurement to the second radio measurement and the first radio measurement plus the hysteresis if the third frequency is the final frequency under evaluation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for frequency redirection in a communication system. While the principles will be described in the environment of a 3GPP Long Term Evolution ("LTE") or a New Radio ("NR") communication system, any environment such as a Wi-Fi wireless communication system is well within the broad scope of the present disclosure.

Figure 1:
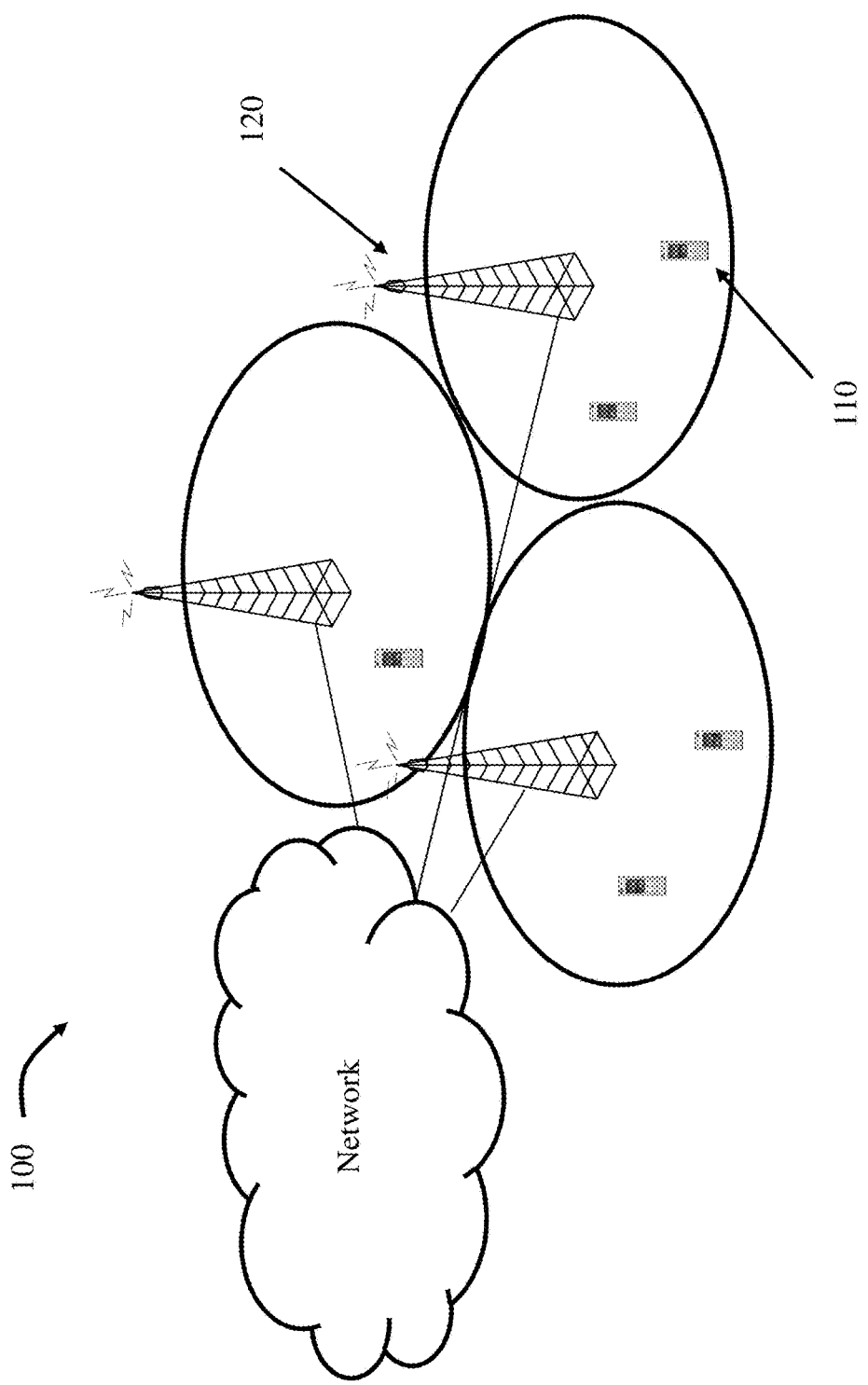
FIGS. 1 to 3 illustrate diagrams of embodiments of a communication system, and portions thereof.
Figure 2:
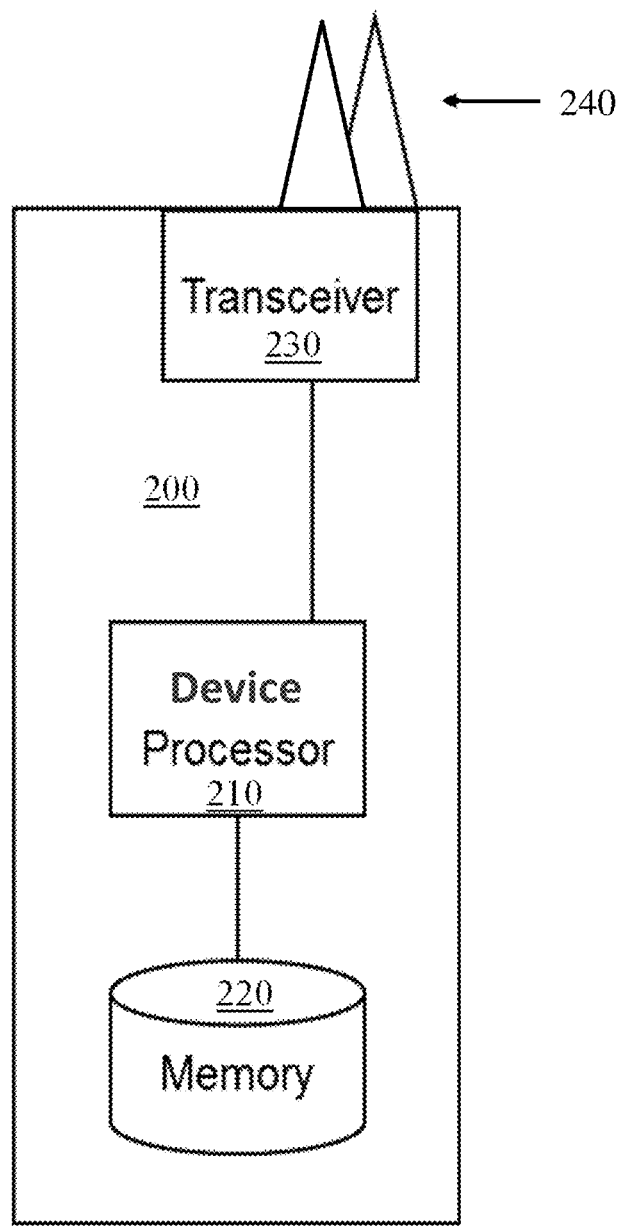
Figure 3:
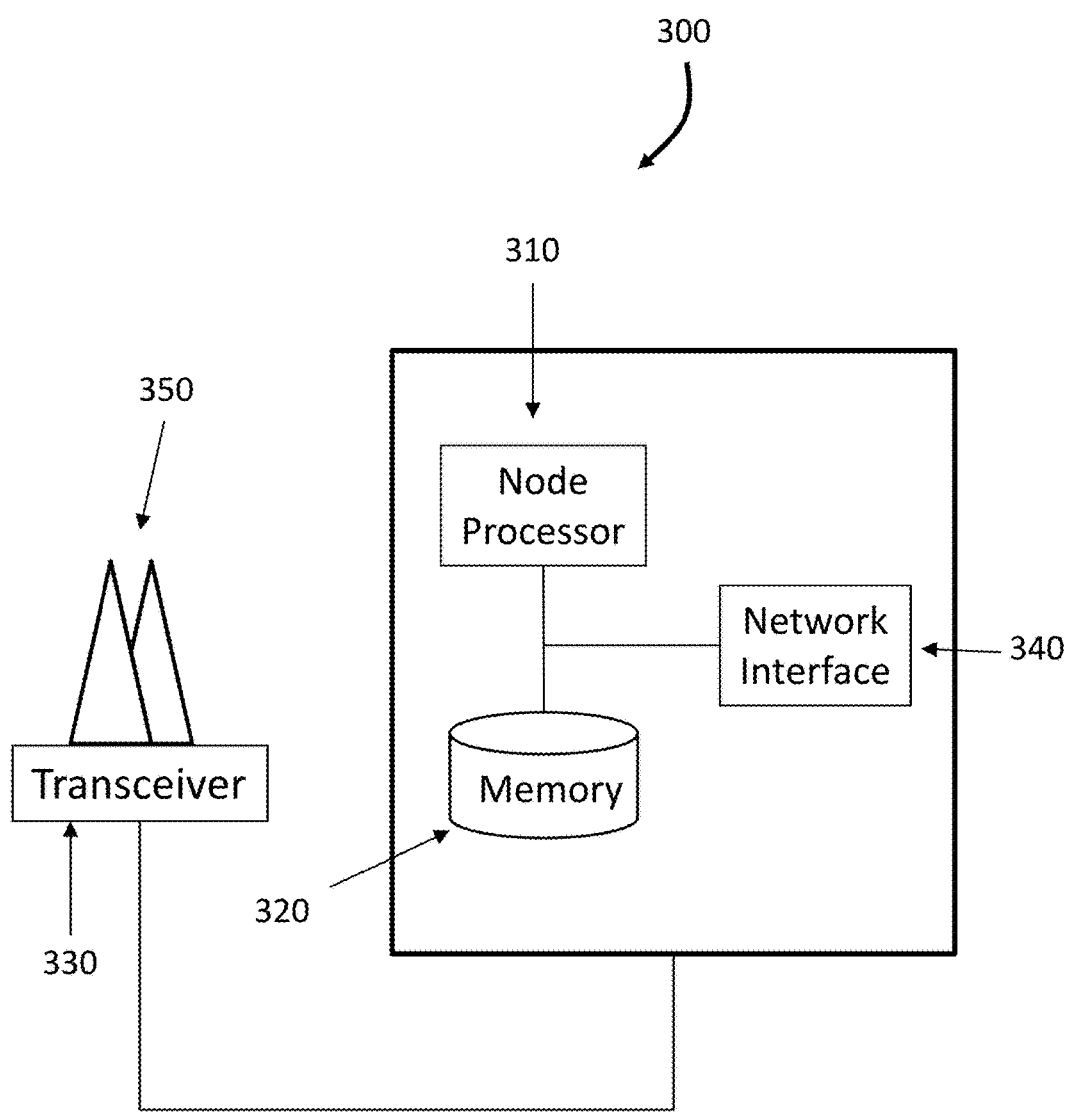

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")).

The wireless communication device 110 may be any device that has an addressable interface (e.g., an Internet protocol ("IP") address, a Bluetooth identifier ("ID"), a near-field communication ("NFC") ID, etc.), a cell radio network temporary identifier ("C-RNTI"), and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The communication system 100 also includes one or more radio access nodes (one of which is designated 120) such as eNodeBs, gNBs or other base stations capable of communicating with the wireless communication devices 110 along with any additional elements suitable to support communication between wireless communication devices 110 or between a wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device 200 illustrated in greater detail by FIG. 2. Similarly, although the illustrated radio access node 120 may represent network nodes that include any suitable combination of hardware and/or software, these nodes may, in particular embodiments, represent devices such as the example radio access node 300 illustrated in greater detail by FIG. 3.

As shown in FIG. 2, the example wireless communication device 200 includes a processor (or processing circuitry) 210, a memory 220, a transceiver 230, and antennas 240. In particular embodiments, some or all of the functionality described above as being provided by machine type communication ("MTC") and machine-to-machine ("M2M") devices, and/or any other types of wireless communication devices may be provided by the device processor executing instructions stored on a computer-readable medium, such as the memory shown in FIG. 2. Alternative embodiments of the wireless communication device 200 may include additional components beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 310, a memory 320, a transceiver 330, a network interface 340 and antennas 350. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

If radio conditions on one or more target frequencies are deteriorated, there are several options available to overcome the loss of or deterioration of the frequency. The need to change frequency can also be due to a service request such as for voice service while the user equipment ("UE") is in a cell not suited for that service. Methods like release with redirection or handover are currently specified for the above purposes. A user equipment may be redirected from one frequency to another improved frequency in an expedited manner to accelerate the redirection procedure. The redirection command may contain multiple target frequencies (including any cell on those frequencies) and include rules for how the user equipment selects among those targets in an expeditious manner. In the case that radio measurements are less than favorable on a frequency, the user equipment can select the most favorable frequency. The user equipment can remain on a less than adequate frequency for a shorter period of time. A user equipment can report to the communication system any target frequency where the user equipment experiences poor radio conditions. The proposed options are beneficial to existing wireless technologies (e.g., 3G, 4G) as well as future wireless technologies.

When the network orders the user equipment to move from one frequency (e.g., a first frequency F1) to another frequency, the following procedure may apply. Instead of sending only one target frequency (e.g., a second frequency F2), the communication system can also provide another target frequency (e.g., a third frequency F3). The communication system can configure a priority for one of target frequencies, wherein a threshold (e.g., TH1, wherein TH1 may be expressed as an offset in relation to the threshold for determination of a suitable cell) is applied in accordance with one of the target frequencies. For instance, once the user equipment receives the target frequencies, the user equipment performs a radio measurement of a communication parameter on a prioritized target frequency (e.g., the second frequency F2). If the radio measurement of the communication parameter exceeds the threshold, the user equipment employs the second frequency (F2) for communication within the communication system. If the measurement of the communication parameter is less than or equal to the threshold, the user equipment employs the third frequency (F3) for communication within the communication system. If the third frequency (F3) also suffers from communication challenges (e.g., also below a threshold), the user equipment may be directed to compare the radio conditions of the third frequency (F3) against the radio conditions of the first and second frequencies (F1, F2). Rather than read the system information, the user equipment may be instructed to remain on the third frequency (F3) or select the first or second frequencies (F1, F2), if the third frequency (F3) also suffers from communication challenges.

Suppose that the radio measurements on frequency (Fn) are −106 decibel-milliwatts ("dbm") and below a network configured threshold of −105 dbm. Suppose that the radio measurements on a first frequency (F1) are −110 dbm. An analysis of the power ratio suggests that the user equipment should select the frequency (Fn) as Meas_Fn>Meas_F1. To perform the above analysis, the user equipment may read the system information associated with the frequency (Fn), but that may cause delay for the user equipment. Whereas if the first frequency (F1) is favored in comparison to other frequencies via an additional hysteresis (HYST1), then it may happen that even though Meas_Fn>Meas_F1, the comparison with the HYST1=5 dB added to Meas_F1 may cause the user equipment to move from the frequency (Fn) to the first frequency (F1) and re-establish the communication thereon without reading the system information for the frequency (Fn).

Suppose that there are several frequencies used in a communication system. The user equipment moves from the first frequency (F1) to a second frequency (F2) if radio conditions on the first frequency (F1) are poor. The process continues that the user equipment moves from the second frequency (F2) to a third frequency (F3) if radio conditions on the second frequency (F2) are poor. The process may continue with respect to other frequencies. If the process continues through a several iterations of frequencies waiting on a better frequency, the delay may become perceptible to the user equipment.

In an embodiment, a radio access node sends to the user equipment a list of target frequencies wherein each frequency is accompanied with a priority and a radio threshold (denoted TH1). Even though the proposed method works for any number of frequencies, for simplicity suppose that there are two target frequencies, namely, a second frequency (F2) and a third frequency (F3). The user equipment is redirected from a serving first frequency (F1) to the prioritized second frequency (F2). If a second radio measurement (Meas_F2) on the second frequency (F2) is less than or equal to the threshold, the user equipment moves to the next and last prioritized third frequency (F3), without reading the system information on the second frequency (F2). Then, if by chance a third radio measurement (Meas_F3) on the third frequency (F3) is less than or equal to the threshold, then before reading the system information on the third frequency (F3), the user equipment compares the third radio measurement (Meas_F3) on the third frequency (F3) with the first radio measurement (Meas_F1) on the first frequency (F1) and the second radio measurement (Meas_F2) on the second frequency (F2).

The comparison is performed according to the following rule. The value of the radio measurements (Meas_Flast) on the last frequency is compared strictly (either > or <) to the values of the radio measurements (Meas_Fn) on the previous frequencies, where n=[2, last-1]. However, when it comes to serving first frequency (F1), the comparison of the radio measurements (Meas_Flast) on the last frequency is done by adding a hysteresis (HYST1) to the radio measurement (Meas_F1) on the first frequency (F1).

In the example above, the third radio measurement (Meas_F3) is checked whether > or < the first radio measurement (Meas_F1). Suppose that the third radio measurement Meas_F3=−106 dbm and first radio measurement Meas_F1=−110 dbm, even though Meas_F3>Meas_F1, the user equipment does not remain with the third frequency (F3). Rather the third radio measurement (Meas_F3) is compared to (Meas_F1+HYST1) where HYST1 could take any value, e.g., 5 dB. If Meas_F3>(Meas_F1+HYST1) the user equipment remains with the third frequency (F3), otherwise the user equipment falls back to the first frequency (F1) without reading the system information associated with the third frequency (F3). As the user equipment initially communicated over the first frequency (F1), the user equipment has already read the system information associated with the first frequency (F1). Conversely according to this example, the user equipment has not read the system information associated with the second and third frequencies (F2, F3). The role of the hysteresis (HYST1) is to influence the user equipment to fall back to the serving first frequency (F1, where it has already read the system information) unless of course the third radio measurement (Meas_F3) is better by the hysteresis (HYST1) than the first measurement (Meas_F1). Note that the hysteresis (HYST1) is used to compare the third frequency (F3) with the serving first frequency (F1) where the communication has been already established and the user equipment has already read the system information.

The user equipment may also notify the communication system of each target frequency (Fx) where the radio measurement (Meas_Fx) does not exceed the threshold (TH1). Also, if for consecutive redirections towards one frequency the radio measurements are still poor below the threshold (TH1), e.g., due to a network outage, such frequency (Fx) can be temporarily removed from the list of frequencies being sent to the user equipment. Once the outage is ceased, the frequency (Fx) can be reinstated (or restored) with the rest of other frequencies.

The value of threshold (TH1) and the value of the hysteresis (HYST1) might change depending on the type of call service and on the type of technology being used on the frequencies under consideration. The type of threshold (TH1) may include, without limitation, a received power level at the user equipment (e.g., reference signal received power ("RSRP") parameter in LTE), or it could reflect the received radio quality at the user equipment (e.g., reference signal received quality ("RSRQ") in LTE) or it could both or it could be another type of threshold.

The information (such as the frequencies, threshold (TH1) and hysteresis (HYST1)) can be provided from the radio access node in different ways. In one example, the information can be sent in one dedicated signalling message exchanged during call setup (e.g., in RRCConnectionSetup in LTE system). In another example (e.g., in case of speech call redirection from 4G to 3G), the information can be sent via broadcasted system information.

Figure 4:
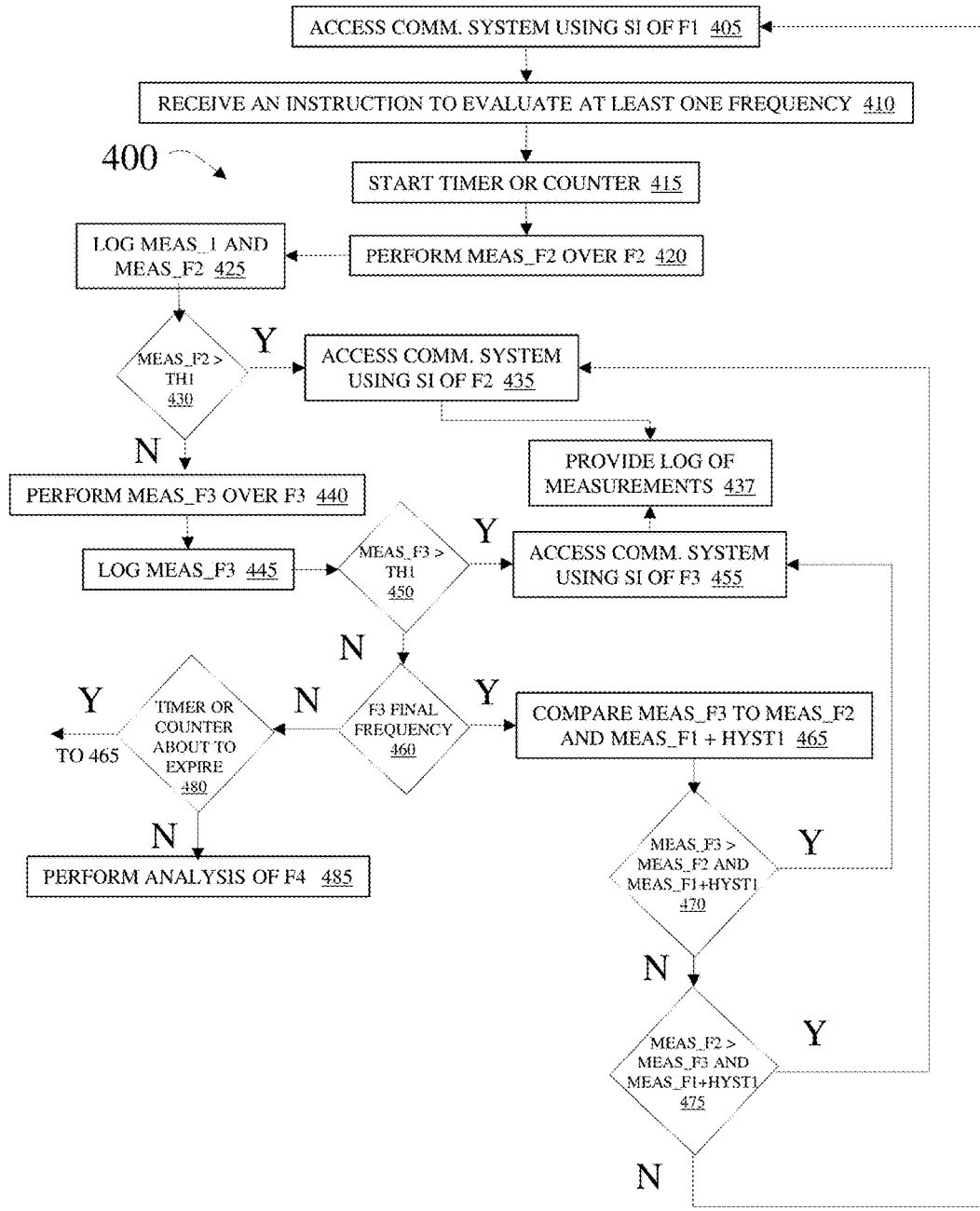
FIGS. 4 and 5 illustrate flow diagrams of embodiments of methods of operating a communication system.

Turning now to FIG. 4, illustrated is a flow diagram of an embodiment of a method 400 of operating a communication system. While the method 400 can accommodate any number of frequencies, the method 400 will be described with three frequencies, namely, a serving first frequency (F1), a priority target frequency (denoted as a second frequency F2), and a next priority target frequency (denoted as a third frequency F3). A radio access node such as a base station provides the second and third frequencies (F2, F3), a radio threshold (a threshold TH1), and a hysteresis (HYST1) to, for instance, a user equipment. The hysteresis (HYST1) is used in a comparison between the radio measurements Meas_Flast=Meas_F3 (the third radio measurement) on the last frequency (the third frequency F3) with the first radio measurement (Meas_F1) on the first frequency (F1).

The method 400 is operable with an apparatus (such as a user equipment 110, 200 introduced with respect to FIGS. 1 and 2) accessing a communication system (such as the communication system 100 introduced with respect to FIG. 1) using first system information associated with the first frequency (F1) providing a first radio measurement (Meas_F1) as introduced at a step or module 405. At a step or module 410, the apparatus receives an instruction to evaluate at least one frequency (such as the second and third frequencies F2, F3) in accordance with the threshold (TH1) and the hysteresis (HYST1). At a step or module 415, the apparatus starts a timer and/or a frequency counter in response to, for instance, a command within the instruction. At a step or module 420, the apparatus performs a second radio measurement (Meas_F2) over the second frequency (F2) without reading second system information associated with the second frequency (F2), and then logs the first and second radio measurements (Meas_F1, Meas_F2) at a step or module 425.

At a decisional step or module 430, the method 400 determines if the second radio measurement (Meas_F2) exceeds the threshold (TH1). When the second radio measurement (Meas_F2) exceeds the threshold (TH1), the apparatus accesses the communication system using the second system information associated with the second frequency (F2) at a step or module 435. The apparatus can also provide a log of the measurements (such as the first radio measurement Meas_F1 and/or the second radio measurement Meas_F2) to a radio access node (such as a base station 120, 300 introduced with respect to FIGS. 1 and 2) at a step or module 437. When the second radio measurement (Meas_F2) is less than or equal to the threshold (TH1), the apparatus performs a third radio measurement (Meas_F3) over the third frequency (F3) without reading third system information associated with the third frequency (F3) at a step of module 440, and then logs the third measurement (Meas_F3) at a step or module 445.

At a decisional step or module 450, the method 400 determines if the third radio measurement (Meas_F3) exceeds the threshold (TH1). When the third radio measurement (Meas_F3) exceeds the threshold (TH1), the apparatus accesses the communication system using the third system information associated with the third frequency (F3) at a step or module 455. The apparatus can also provide a log of the measurements (such as the first radio measurement Meas_F1, the second radio measurement Meas_F2 and/or the third radio measurement Meas_F3) to the radio access node at the step or module 437.

When the third radio measurement (Meas_F3) is less than or equal to the threshold (TH1), the method 400 determines if the third frequency (F3) is a final frequency under evaluation at a decisional step or module 460. If the third frequency (F3) is the final frequency under evaluation, the apparatus compares the third radio measurement (Meas_F3) to the second radio measurement (Meas_F2) and the first radio measurement (Meas_F1) plus the hysteresis (HYST1) at a step or module 465. At a decisional step or module 470, the method 400 determines if the third radio measurement (Meas_F3) exceeds the second radio measurement (Meas_F2) and the first radio measurement (Meas_F1) plus the hysteresis (HYST1). When the third radio measurement (Meas_F3) exceeds the second radio measurement (Meas_F2) and the first radio measurement (Meas_F1) plus the hysteresis (HYST1), the apparatus accesses the communication system using the third system information associated with the third frequency (F3) at the step or module 455. The apparatus can also provide a log of the measurements (such as the first radio measurement Meas_F1, the second radio measurement Meas_F2 and/or the third radio measurement Meas_F3) to the radio access node at the step or module 437.

When the third radio measurement (Meas_F3) is less than or equal to the second radio measurement (Meas_F2) and the first radio measurement (Meas_F1) plus the hysteresis (HYST1), the method 400 determines if the second radio measurement (Meas_F2) exceeds the third radio measurement (Meas_F3) and the first radio measurement (Meas_F1) plus the hysteresis (HYST1) at a decisional step or module 475. When the second radio measurement (Meas_F2) exceeds the third radio measurement (Meas_F3) and the first radio measurement (Meas_F1) plus the hysteresis (HYST1), the apparatus accesses the communication system using the second system information associated with the second frequency (F2) at the step or module 435. The apparatus can also provide a log of the measurements (such as the first radio measurement Meas_F1, the second radio measurement Meas_F2 and/or the third radio measurement Meas_F3) to the radio access node at the step or module 437. When the second radio measurement (Meas_F2) is less than or equal to the third radio measurement (Meas_F3) and the first radio measurement (Meas_F1) plus the hysteresis (HYST1), the apparatus continues to access the communication system using the first system information associated with the first frequency (F1) at the step or module 405. The apparatus can also provide a log of the measurements (such as the first radio measurement Meas_F1, the second radio measurement Meas_F2 and/or the third radio measurement Meas_F3) similar to the steps or modules described above.

Returning to the decisional step or module 460, if the third frequency (F3) is not the final frequency under evaluation, the method 400 determines if the timer or the frequency counter is about to expire at a decisional step or module 480. If the timer or the frequency counter is about to expire, the method 400 returns to the step or module 465, otherwise, the method 400 continues to perform an analysis of a fourth frequency (F4) analogous to the preceding frequencies such as the third frequency (F3) at a step or module 485. The role of the frequency counter is to limit the number of frequency hops being used (or frequencies under consideration) to avoid a radio gap interruption of a communication on the serving first frequency (F1). If the radio gap is too long, the communication might be dropped or the subscriber might notice such interruption. In fact, each time the user equipment moves from one frequency to another, or evaluates different frequencies, the communication on the first serving frequency (F1) may be "on hold." A similar principle applies to the timer that begins when the user equipment begins evaluating other frequencies. Of course, the method 400 may continue to analyze several frequencies and the order of ones of the steps or modules such as logging the measurements may be performed in a different order, or omitted as the application dictates.

Figure 5:
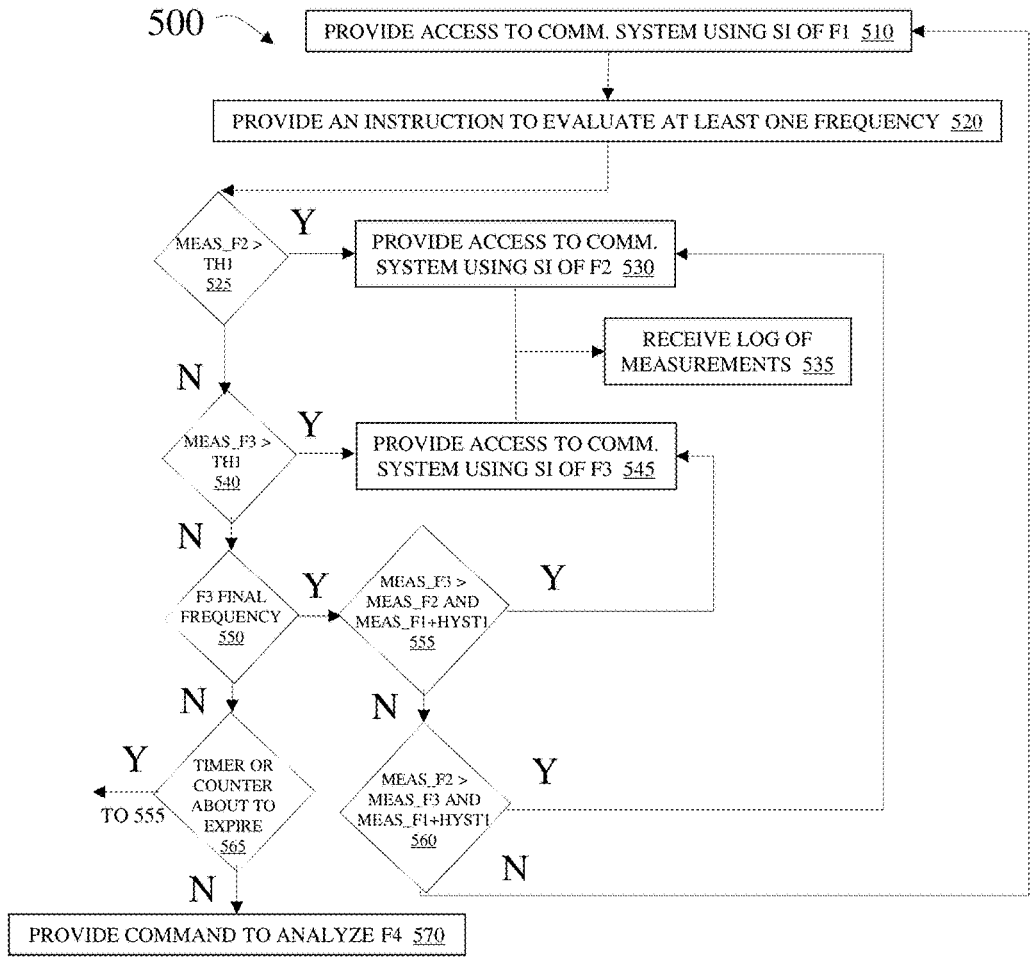

Turning now to FIG. 5, illustrated is a flow diagram of an embodiment of a method 500 of operating a communication system. While the method 500 can accommodate any number of frequencies, the method 500 will be described with three frequencies, namely, a serving first frequency (F1), a priority target frequency (denoted as a second frequency F2), and a next priority target frequency (denoted as a third frequency F3). A radio access node provides the second and third frequencies (F2, F3), a radio threshold (a threshold TH1), and a hysteresis (HYST1) to, for instance, a user equipment. The hysteresis (HYST1) is used in a comparison between the radio measurements Meas_Flast=Meas_F3 (the third radio measurement) on the last frequency (the third frequency F3) with the first radio measurement (Meas_F1) on the first frequency (F1).

The method 500 is operable in part with an apparatus (such as a base station 120, 300 introduced with respect to FIGS. 1 and 2) providing access for a user equipment (such as a user equipment 110, 200 introduced with respect to FIGS. 1 and 2) to a communication system (such as the communication system 100 introduced with respect to FIG. 1) using first system information associated with the first frequency (F1) as a function of a first radio measurement (Meas_F1) as introduced at a step or module 510.

At a step or module 520, the apparatus provides an instruction to evaluate at least one frequency (such as the second and third frequencies F2, F3) in accordance with the threshold (TH1) and the hysteresis (HYST1). The procedure for providing access can be designed in different ways. If the command in the step or module 520 tells the user equipment to access the second frequency (F2, optionally specific cell on the second frequency F2) from an idle mode, then the normal target network admission procedure performed by the user equipment for the idle mode applies. If the command in the step or module 520 tells the user equipment to access the second frequency (F2) from radio resource control ("RRC") Connected Mode, then a target base station/cell will be prepared at least with user equipment context to identify the user equipment and thus be able to associate the user equipment with the correct security context. Of course, these procedures apply to other access steps or modules herein.

At a decisional step or module 525, the user equipment determines if a second radio measurement (Meas_F2) of the second frequency (F2) exceeds the threshold (TH1). When the second radio measurement (Meas_F2) exceeds the threshold (TH1), the apparatus provides access for the user equipment to the communication system using second system information associated with the second frequency (F2) at a step or module 530. The apparatus may also receive a log of the measurements (such as the first radio measurement Meas_F1 and/or the second radio measurement Meas_F2) from the user equipment at a step or module 535.

When the second radio measurement (Meas_F2) is less than or equal to the threshold (TH1), the user equipment determines if a third radio measurement (Meas_F3) of the third frequency (F3) exceeds the threshold (TH1) at a decisional step or module 540. When the third radio measurement (Meas_F3) exceeds the threshold (TH1), the apparatus provides access for the user equipment to the communication system using third system information associated with the third frequency (F3) at a step or module 545. The apparatus may also receive a log of the measurements (such as the first radio measurement Meas_F1, the second radio measurement Meas_F2 and/or the third radio measurement Meas_F3) from the user equipment at the step or module 535.

When the third radio measurement (Meas_F3) is less than or equal to the threshold (TH1), the user equipment determines if the third frequency (F3) is a final frequency under evaluation at a decisional step or module 550. If the third frequency (F3) is the final frequency under evaluation, the user equipment determines if the third radio measurement (Meas_F3) exceeds the second radio measurement (Meas_F2) and the first radio measurement (Meas_F1) plus the hysteresis (HYST1) at a decisional step or module 555.

When the third radio measurement (Meas_F3) exceeds the second radio measurement (Meas_F2) and the first radio measurement (Meas_F1) plus the hysteresis (HYST1), the apparatus provides access for the user equipment to the communication system using the third system information associated with the third frequency (F3) at the step or module 545. The apparatus may also receive a log of the measurements (such as the first radio measurement Meas_F1, the second radio measurement Meas_F2 and/or the third radio measurement Meas_F3) from the user equipment at the step or module 535.

When the third radio measurement (Meas_F3) is less than or equal to the second radio measurement (Meas_F2) and the first radio measurement (Meas_F1) plus the hysteresis (HYST1), the user equipment determines if the second radio measurement (Meas_F2) exceeds the third radio measurement (Meas_F3) and the first radio measurement (Meas_F1) plus the hysteresis (HYST1) at a decisional step or module 560. When the second radio measurement (Meas_F2) exceeds the third radio measurement (Meas_F3) and the first radio measurement (Meas_F1) plus the hysteresis (HYST1), the apparatus provides access for the user equipment to the communication system using the second system information associated with the second frequency (F2) at the step or module 530. The apparatus may also receive a log of the measurements (such as the first radio measurement Meas_F1, the second radio measurement Meas_F2 and/or the third radio measurement Meas_F3) from the user equipment at the step or module 535.

When the second radio measurement (Meas_F2) is less than or equal to the third radio measurement (Meas_F3) and the first radio measurement (Meas_F1) plus the hysteresis (HYST1), the apparatus continues to provide access for the user equipment to the communication system using the first system information associated with the first frequency (F1) at the step or module 510. The apparatus may also receive a log of the measurements (such as the first radio measurement Meas_F1, the second radio measurement Meas_F2 and/or the third radio measurement Meas_F3) from the user equipment similar to the steps or modules described above.

Returning to the decisional step or module 550, if the third frequency (F3) is not the final frequency under evaluation, the user equipment determines if a timer or a frequency counter is about to expire at a decisional step or module 565. If the timer or the frequency counter is about to expire, the method 500 returns to the decisional step or module 555, otherwise, the method 500 continues by providing a command to analyze a fourth frequency (F4) similar to the analysis of the preceding frequencies such as the third frequency (F3) at a step or module 570. The role of the frequency counter is to limit the number of frequency hops being used (or frequencies under consideration) to avoid a radio gap interruption of a communication on the serving first frequency (F1). If the radio gap is too long, the communication might be dropped or the subscriber might notice such interruption. In fact, each time the user equipment moves from one frequency to another, or evaluates different frequencies, the communication on the first serving frequency (F1) may be "on hold." A similar principle applies to the timer that begins when the user equipment begins evaluating other frequencies. Of course, the user equipment may continue to analyze several frequencies and the order of ones of the steps or modules such as receiving a log of the measurements may be performed in a different order, or omitted as the application dictates.

Figure 6:
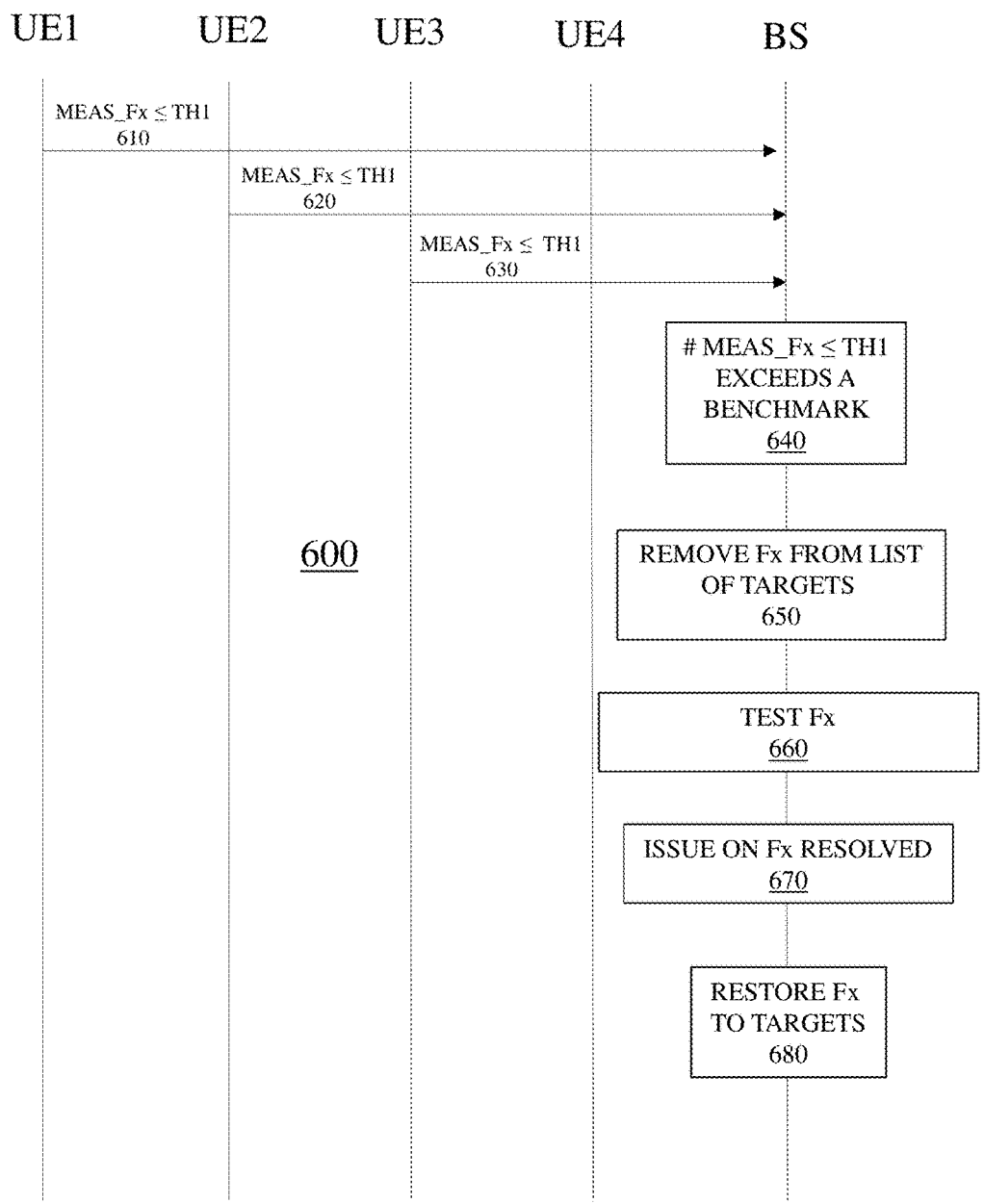
FIG. 6 illustrates a signaling diagram of an embodiment of a method of operating a communication system.

Turning now to FIG. 6, illustrated is a signaling diagram of an embodiment of a method 600 of operating a communication system. The communication system includes first, second, third and fourth user equipment UE1, UE2, UE3, UE4 and a radio access node such as a base station BS. The first user equipment UE1 logs and reports 610 to the base station BS that a radio measurement (Meas_Fx) for a target frequency (Fx) is less than or equal to a first threshold (TH1). Similarly, the second user equipment UE2 logs and reports 620 to the base station BS that a radio measurement (Meas_Fx) for the target frequency (Fx) is less than or equal to the first threshold (TH1). The third user equipment UE3 also logs and reports 630 to the base station BS that a radio measurement (Meas_Fx) for the target frequency (Fx) is less than or equal to the first threshold (TH1).

Even though the fourth user equipment UE4 did not report to the base station BS that a radio measurement (Meas_Fx) for the target frequency (Fx) is less than or equal to the first threshold (TH1), the number of radio measurements (Meas_Fx) for the target frequency (Fx) being less than or equal to the first threshold (TH1) exceeds a benchmark as indicated by a step or module 640. As a result, the base station BS temporarily removes (as indicated by a step or module 650) the target frequency (Fx) from a list of targets.

After a period of time, the base station BS tests (as indicated by a step or module 660) the target frequency (Fx) to ascertain if the radio measurement (Meas_Fx) for the target frequency (Fx) is still less than or equal to the first threshold (TH1). If the radio measurement (Meas_Fx) for the target frequency (Fx) exceeds the first threshold (TH1), the issue on the target frequency (Fx) is resolved (as indicated by a step or module 670). The base station BS then restores (as indicated by a step or module 680) the target frequency (Fx) to the list of targets.

It should be noted that network node reaction to user equipment measurement logs may not only include removing a frequency. In fact, an analysis of the measurement logs might trigger different actions based on the situation. In one example, if a first frequency (F1) is congested or almost congested, rather than favoring the first frequency (F1), the base station might adjust the hysteresis (HYST1, e.g., minimize it as much as possible or reduce it to the value equal 1). As such, the user equipment may favor a target second frequency (F2) rather than the first frequency (F1), even though the user equipment might have read additional system information that creates delay. In another example, if some, but not all, user equipment reports poor measurements on the target second frequency (F2), then rather than removing the second frequency (F2), the base station may penalize the priority of the second frequency (F2) so that a target third frequency (F3) temporarily has higher priority. As such, the second frequency (F2) may only be used when the third frequency (F3) is completely congested. Of course, when the radio measurements of the second frequency (F2) improve, the second frequency (F2) will be prioritized over the third frequency (F3). In yet another example, the first threshold (TH1) might be initially set to a value, then based on radio measurement reporting logs and the status of the cell (congested or not), the value of the first threshold (TH1) may be adjusted to trigger more movement between frequencies.

Thus, when the user equipment evaluates a target frequency, a radio measurement thereof is compared against a threshold. If the radio measurement exceeds a threshold, the user equipment accesses the communication system using system information of the target frequency. Otherwise, the user equipment evaluates another target frequency. The user equipment can report the radio measurements to a radio access node throughout the process. At the last frequency under consideration, the user equipment compares the radio measurement of the last frequency to the radio measurements of the target frequencies and to the radio measurement of the serving first frequency plus a hysteresis. As described above, the user equipment accesses the communication system on one of the above frequencies, but favors the serving first frequency by the hysteresis. Also, along the process the radio access node may temporarily remove a frequency under consideration if the frequency suffers multiple reports of unfavorable radio measurements, or suffers a single catastrophic radio condition.

Figure 7:
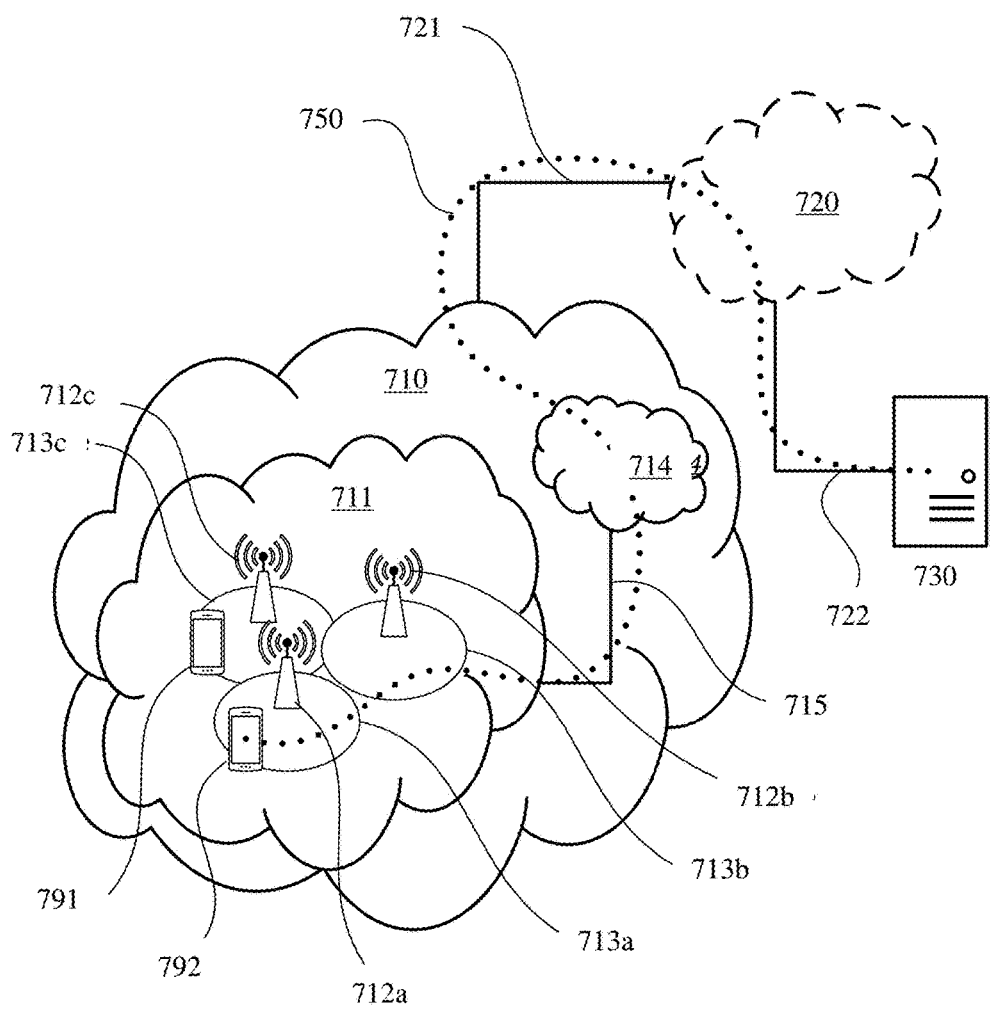
FIG. 7 illustrates a schematic view of an embodiment of a communication system.

Turning now to FIG. 7, illustrated is a schematic view of an embodiment of a communication system including a communication network (e.g., a 3GPP-type cellular network) 710 connected to a host computer. The communication network 710 includes an access network 711, such as a radio access network, and a core network 714. The access network 711 includes a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment ("UE") 791 located in coverage area 713c is configured to wirelessly connect to, or be paged by, the corresponding base station 712c. A second user equipment 792 in coverage area 713a is wirelessly connectable to the corresponding base station 712a. While a plurality of user equipment 791, 792 are illustrated in this example, the disclosed embodiments are equally applicable to a situation where a sole user equipment is in the coverage area or where a sole user equipment is connecting to the corresponding base station 712.

The communication network 710 is itself connected to the host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the communication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may include two or more sub-networks (not shown).

The communication system of FIG. 7 as a whole enables connectivity between one of the connected user equipment 791, 792 and the host computer 730. The connectivity may be described as an over-the-top ("OTT") connection 750. The host computer 730 and the connected user equipment 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected user equipment 791. Similarly, the base station 712 need not be aware of the future routing of an outgoing uplink communication originating from the user equipment 791 towards the host computer 730.

Figure 8:
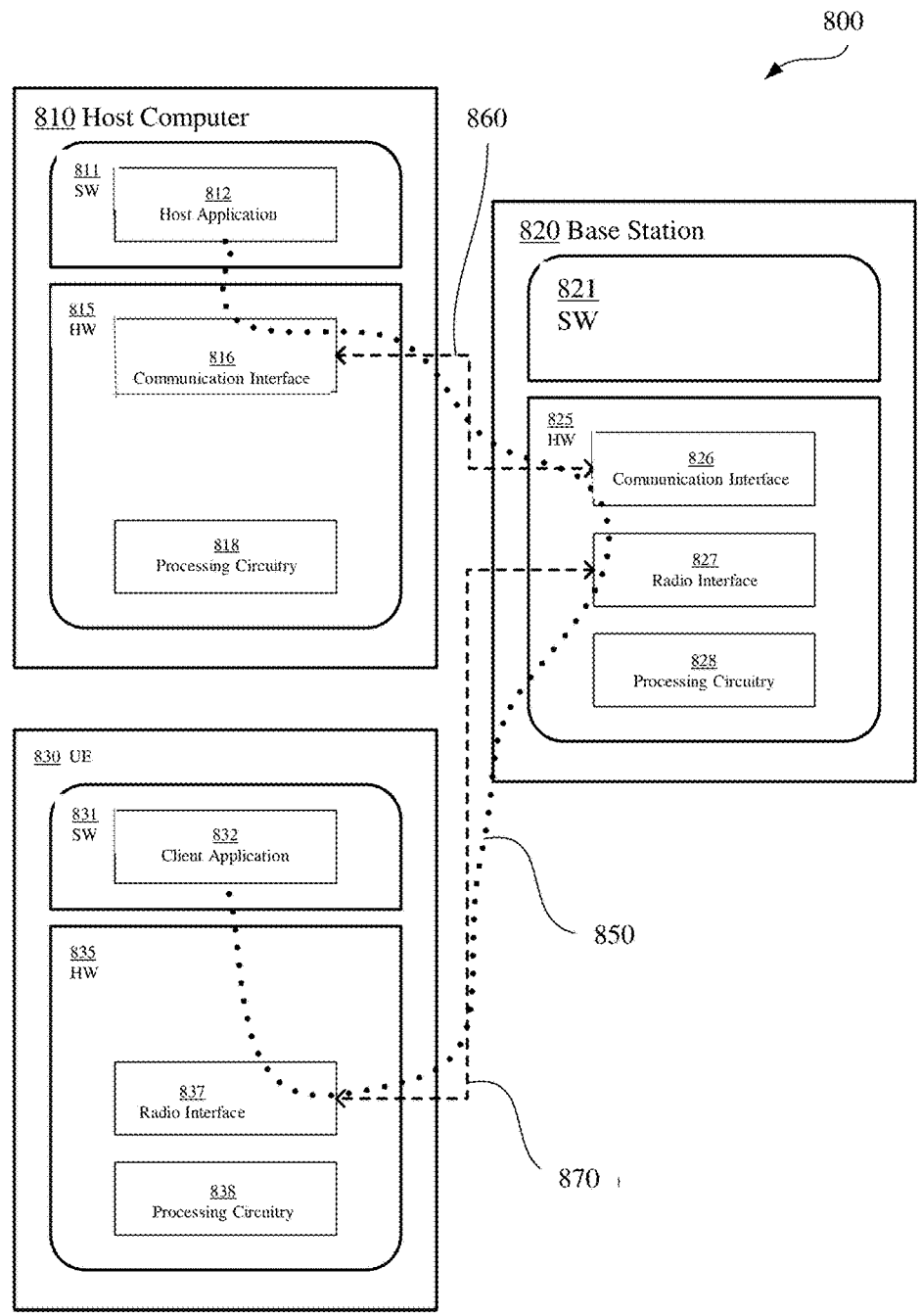
FIG. 8 illustrates a block diagram of an embodiment of a communication system.

Turning now to FIG. 8, illustrated is a block diagram of an embodiment of a communication system 800. In the communication system 800, a host computer 810 includes hardware 815 including a communication interface 816 configured to set up and maintain a wired or wireless connection with an interface of a different communication device of the communication system 800. The host computer 810 further includes processing circuitry (a processor) 818, which may have storage and/or processing capabilities. In particular, the processing circuitry 818 may include one or more programmable processors, application-specific integrated circuits, field programmable gate arrays or combinations of these (not shown) adapted to execute instructions. The host computer 810 further includes software 811, which is stored in or accessible by the host computer 810 and executable by the processing circuitry 818. The software 811 includes a host application 812. The host application 812 may be operable to provide a service to a remote user, such as a user equipment ("UE") 830 connecting via an OTT connection 850 terminating at the user equipment 830 and the host computer 810. In providing the service to the remote user, the host application 812 may provide user data which is transmitted using the OTT connection 850.

The communication system 800 further includes a base station 820 provided in a communication system and including hardware 825 enabling it to communicate with the host computer 810 and with the user equipment 830. The hardware 825 may include a communication interface 826 for setting up and maintaining a wired or wireless connection with an interface of a different communication device of the communication system 800, as well as a radio interface 827 for setting up and maintaining at least a wireless connection 870 with a user equipment 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the communication system and/or through one or more intermediate networks outside the communication system. In the embodiment shown, the hardware 825 of the base station 820 further includes processing circuitry (a processor) 828, which may include one or more programmable processors, application-specific integrated circuits, field programmable gate arrays or combinations of these (not shown) adapted to execute instructions. The base station 820 further has software 821 stored internally or accessible via an external connection.

The communication system 800 further includes the user equipment 830. The user equipment 830 includes hardware 835 having a radio interface 837 configured to set up and maintain a wireless connection 870 with a base station 820 serving a coverage area in which the user equipment 830 is currently located. The hardware 835 of the user equipment 830 further includes processing circuitry (a processor) 838, which may comprise one or more programmable processors, application-specific integrated circuits, field programmable gate arrays or combinations of these (not shown) adapted to execute instructions. The user equipment 830 further includes software 831, which is stored in or accessible by the user equipment 830 and executable by the processing circuitry 838. The software 831 includes a client application 832. The client application 832 may be operable to provide a service to a human or non-human user via the user equipment 830, with the support of the host computer 810. In the host computer 810, an executing host application 812 may communicate with the executing client application 832 via the OTT connection 850 terminating at the user equipment 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, base station 820 and user equipment 830 illustrated in FIG. 8 may be identical to the host computer 730, one of the base stations 712a, 712b, 712c and one of the user equipment 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the user equipment 830 or from the service provider operating the host computer 810, or both. While the OTT connection 850 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 850 between the host computer 810 and user equipment 830, in response to variations in the measurement results. The measurement procedure and/or the network functionality for reconfiguring the OTT connection 850 may be implemented in the software 811 of the host computer 810 or in the software 831 of the user equipment 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary user equipment signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors, etc.

A system and method for frequency redirection in a communication system has been introduced herein. In one embodiment (and with continuing reference to the aforementioned FIGUREs), an apparatus (such as a user equipment 110, 200) is configured to access (405) a communication system (100) using first system information associated with a first frequency (F1) providing a first radio measurement (Meas_F1). The apparatus (110, 200) is configured to receive (410) an instruction to evaluate at least one frequency in accordance with a threshold (TH1) and a hysteresis (HYST1), and perform (420) a second radio measurement (Meas_F2) over a second frequency (F2) without reading second system information associated with the second frequency (F2). The apparatus (110, 200) is configured to determine (430) if the second radio measurement (Meas_F2) exceeds the threshold (TH1), and access (435) the communication system (100) using the second system information associated with the second frequency (F2) when the second radio measurement (Meas_F2) exceeds the threshold (TH1). The apparatus (110, 200) is configured to perform (440) a third radio measurement (Meas_F3) over a third frequency (F3) when the second radio measurement (Meas_F2) is less than or equal to the threshold (TH1) and without reading third system information associated with the third frequency (F3). The apparatus (110, 200) is configured to determine (450) if the third radio measurement (Meas_F3) exceeds the threshold (TH1), and access (455) the communication system (100) using the third system information associated with the third frequency (F3) when the third radio measurement (Meas_F3) exceeds the threshold (TH1). The apparatus (110, 200) is configured to determine (460) if the third frequency (F3) is a final frequency under evaluation when the third radio measurement (Meas_F3) is less than or equal to the threshold (TH1), and compare (465) the third radio measurement (Meas_F3) to the second radio measurement (Meas_F2) and the first radio measurement (Meas_F1) plus the hysteresis (HYST1) if the third frequency (F3) is the final frequency under evaluation. The apparatus (110, 200) is configured to log (425, 445) the first radio measurement (Meas_F1), the second radio measurement (Meas_F2) and/or the third radio measurement (Meas_F3).

Continuing with the third frequency (F3) being the final frequency under evaluation, the apparatus (110, 200) is further configured to determine (470) if the third radio measurement (Meas_F3) exceeds the second radio measurement (Meas_F2) and the first radio measurement (Meas_F1) plus the hysteresis (HYST1), and access (455) the communication system (100) using the third system information associated with the third frequency (F3) when the third radio measurement (Meas_F3) exceeds the second radio measurement (Meas_F2) and the first radio measurement (Meas_F1) plus the hysteresis (HYST1). The apparatus (110, 200) is further configured to determine (475) if the second radio measurement (Meas_F2) exceeds the third radio measurement (Meas_F3) and the first radio measurement (Meas_F1) plus the hysteresis (HYST1) when the third radio measurement (Meas_F3) is less than or equal to the second radio measurement (Meas_F2) and the first radio measurement (Meas_F1) plus the hysteresis (HYST1). The apparatus (110, 200) is configured to access (435) the communication system (100) using the second system information associated with the second frequency (F2) when the second radio measurement (Meas_F2) exceeds the third radio measurement (Meas_F3) and the first radio measurement (Meas_F1) plus the hysteresis (HYST1), and continue to access (405) the communication system (100) using the first system information associated with the first frequency (F1) when the second radio measurement (Meas_F2) is less than or equal to the third radio measurement (Meas_F3) and the first radio measurement (Meas_F1) plus the hysteresis (HYST1).

The apparatus (110, 200) is also configured to start (415) a timer or a frequency counter in accordance with receiving the instruction, determine (480) if the timer or the frequency counter is about to expire when the third frequency (F3) is not the final frequency under evaluation, and compare (465) the third radio measurement (Meas_F3) to the second radio measurement (Meas_F2) and the first radio measurement (Meas_F1) plus the hysteresis (HYST1) if the timer or the frequency counter is about to expire. If the timer or the frequency counter is about to expire, the apparatus (110, 200) is configured determine (470) if the third radio measurement (Meas_F3) exceeds the second radio measurement (Meas_F2) and the first radio measurement (Meas_F1) plus the hysteresis (HYST1), and access (455) the communication system (100) using the third system information associated with the third frequency (F3) when the third radio measurement (Meas_F3) exceeds the second radio measurement (Meas_F2) and the first radio measurement (Meas_F1) plus the hysteresis (HYST1). If the timer or the frequency counter is about to expire, the apparatus (110, 200) is further configured to determine (475) if the second radio measurement (Meas_F2) exceeds the third radio measurement (Meas_F3) and the first radio measurement (Meas_F1) plus the hysteresis (HYST1) when the third radio measurement (Meas_F3) is less than or equal to the second radio measurement (Meas_F2) and said first radio measurement (Meas_F1) plus the hysteresis (HYST1). If the timer or the frequency counter is about to expire, the apparatus (110, 200) is configured to access (435) the communication system (100) using the second system information associated with the second frequency (F2) when the second radio measurement (Meas_F2) exceeds the third radio measurement (Meas_F3) and the first radio measurement (Meas_F1) plus the hysteresis (HYST1), and access (405) the communication system (100) using the first system information associated with the first frequency (F1) when the second radio measurement (Meas_F2) is less than or equal to the third radio measurement (Meas_F3) and the first radio measurement (Meas_F1) plus the hysteresis (HYST1).

The apparatus (110, 200) is further configured to provide (437) a log of the first radio measurement (Meas_F1), the second radio measurement (Meas_F2) and/or the third radio measurement (Meas_F3) to a radio access node (120, 300). If the third frequency (F3) is not the final frequency under evaluation, the apparatus (110, 200) is configured to perform (485) an analysis of a fourth frequency (F4) akin to the analysis of the previous frequencies.

In another embodiment (and with continuing reference to the aforementioned FIGUREs), an apparatus (such as a radio access node 120, 300) is configured to provide (510) access for a user equipment (110, 200) to a communication system (100) using first system information associated with a first frequency (F1) as a function of a first radio measurement (Meas_F1). The apparatus (120, 300) is configured to provide (520) an instruction to the user equipment (110, 200) to evaluate at least one frequency in accordance with a threshold (TH1) and a hysteresis (HYST1), provide (530) access for the user equipment (110, 200) to the communication system (100) using second system information associated with a second frequency (F2) when a second radio measurement (Meas_F2) of the second frequency (F2) exceeds the threshold (TH1), and provide (545) access for the user equipment (110, 200) to the communication system (100) using third system information associated with a third frequency (F3) when a third radio measurement (Meas_F3) of the third frequency (F3) exceeds the threshold (TH1) and the second radio measurement (Meas_F2) is less than or equal to the threshold (TH1).

If the third frequency (F3) is a final frequency under evaluation, the apparatus (120, 300) is further configured to provide (545) access for the user equipment (110, 200) to the communication system (100) using the third system information associated with the third frequency (F3) when the third radio measurement (Meas_F3) is less than or equal to the threshold (TH1), and the third radio measurement (Meas_F3) exceeds the second radio measurement (Meas_F2) and the first radio measurement (Meas_F1) plus the hysteresis (HYST1). Additionally when the third frequency (F3) is a final frequency under evaluation, the apparatus (120, 300) is configured to provide (530) access for the user equipment (110, 200) to the communication system (100) using the second system information associated with the second frequency (F2) when the third radio measurement (Meas_F3) is less than or equal to the second radio measurement (Meas_F2) and the first radio measurement (Meas_F1) plus the hysteresis (HYST1), and the second radio measurement (Meas_F2) exceeds the third radio measurement (Meas_F3) and the first radio measurement (Meas_F1) plus the hysteresis (HYST1). Also when the third frequency (F3) is a final frequency under evaluation, the apparatus (120, 300) is configured to continuing to provide (510) access for the user equipment (110, 200) to the communication system (100) using the first system information associated with the first frequency (F1) when the third radio measurement (Meas_F3) is less than or equal to the second radio measurement (Meas_F2) and the first radio measurement (Meas_F1) plus the hysteresis (HYST1), and the second radio measurement (Meas_F2) is less than or equal to the third radio measurement (Meas_F3) and the first radio measurement (Meas_F1) plus the hysteresis (HYST1).

If the third frequency (F3) is not a final frequency under evaluation, and a timer or a frequency counter is about to expire, the apparatus (120, 300) is configured to provide (545) access for the user equipment (110, 200) to the communication system (100) using the third system information associated with the third frequency (F3) when the third radio measurement (Meas_F3) is less than or equal to the threshold (TH1), and the third radio measurement (Meas_F3) exceeds the second radio measurement (Meas_F2) and the first radio measurement (Meas_F1) plus said hysteresis (HYST1). Additionally when the third frequency (F3) is not a final frequency under evaluation and a timer or a frequency counter is about to expire, the apparatus (120, 300) is configured to provide (530) access for the user equipment (110, 200) to the communication system (100) using the second system information associated with the second frequency (F2) when the third radio measurement (Meas_F3) is less than or equal to the second radio measurement (Meas_F2) and the first radio measurement (Meas_F1) plus the hysteresis (HYST1), and the second radio measurement (Meas_F2) exceeds the third radio measurement (Meas_F3) and the first radio measurement (Meas_F1) plus said hysteresis (HYST1). Also when the third frequency (F3) is not a final frequency under evaluation and a timer or a frequency counter is about to expire, the apparatus (120, 300) is configured to continuing to provide (510) access for the user equipment (110, 200) to the communication system (100) using the first system information associated with the first frequency (F1) when the third radio measurement (Meas_F3) is less than or equal to the second radio measurement (Meas_F2) and the first radio measurement (Meas_F1) plus the hysteresis (HYST1), and the second radio measurement (Meas_F2) is less than or equal to the third radio measurement (Meas_F3) and the first radio measurement (Meas_F1) plus the hysteresis (HYST1).

The apparatus (120, 300) is configured to receive (535) a log of the first radio measurement (Meas_F1), the second radio measurement (Meas_F2) and/or the third radio measurement (Meas_F3) from the user equipment (110, 200). The apparatus (120, 300) is also configured to temporarily remove a deficient frequency from the at least one frequency for evaluation in accordance with providing (520) the instruction to the user equipment (110, 200). If the third frequency (F3) is not a final frequency under evaluation, and a timer or a frequency counter is not about to expire, the apparatus (120, 300) is configured to provide (570) a command to analyze a fourth frequency (F4) when the third radio measurement (Meas_F3) is less than or equal to the threshold (TH1).

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. An apparatus configured to access a communication system using first system information associated with a first frequency providing a first radio measurement, comprising:
    processing circuitry configured to:
        receive an instruction to evaluate at least one frequency in accordance with a threshold and a hysteresis;
        perform a second radio measurement over a second frequency without reading second system information associated with said second frequency;
        determine if said second radio measurement exceeds said threshold;
            access said communication system using said second system information associated with said second frequency when said second radio measurement exceeds said threshold;
            perform a third radio measurement over a third frequency when said second radio measurement is less than or equal to said threshold and without reading third system information associated with said third frequency;
        determine if said third radio measurement exceeds said threshold;
            access said communication system using said third system information associated with said third frequency when said third radio measurement exceeds said threshold; and
            determine if said third frequency is a final frequency under evaluation when said third radio measurement is less than or equal to said threshold;
                compare said third radio measurement to said second radio measurement and said first radio measurement plus said hysteresis if said third frequency is said final frequency under evaluation.

2. The apparatus as recited in claim 1 wherein said processing circuitry is further configured to log said first radio measurement and said second radio measurement.

3. The apparatus as recited in claim 1 wherein said processing circuitry is further configured to log said third radio measurement.

4. The apparatus as recited in claim 1 wherein said processing circuitry is further configured to:
    determine if said third radio measurement exceeds said second radio measurement and said first radio measurement plus said hysteresis; and
    access said communication system using said third system information associated with said third frequency when said third radio measurement exceeds said second radio measurement and said first radio measurement plus said hysteresis.

5. The apparatus as recited in claim 4 wherein said processing circuitry is further configured to:
    determine if said second radio measurement exceeds said third radio measurement and said first radio measurement plus said hysteresis when said third radio measurement is less than or equal to said second radio measurement and said first radio measurement plus said hysteresis;
    access said communication system using said second system information associated with said second frequency when said second radio measurement exceeds said third radio measurement and said first radio measurement plus said hysteresis; and
    access said communication system using said first system information associated with said first frequency when said second radio measurement is less than or equal to said third radio measurement and said first radio measurement plus said hysteresis.

6. The apparatus as recited in claim 1 wherein said processing circuitry is further configured to:
    start a timer or a frequency counter in accordance with receiving said instruction;
    determine if said timer or said frequency counter is about to expire when said third frequency is not said final frequency under evaluation; and
    compare said third radio measurement to said second radio measurement and said first radio measurement plus said hysteresis if said timer or said frequency counter is about to expire.

7. The apparatus as recited in claim 6 wherein said processing circuitry is further configured to:
    determine if said third radio measurement exceeds said second radio measurement and said first radio measurement plus said hysteresis; and
    access said communication system using said third system information associated with said third frequency when said third radio measurement exceeds said second radio measurement and said first radio measurement plus said hysteresis.

8. The apparatus as recited in claim 7 wherein said processing circuitry is further configured to:
    determine if said second radio measurement exceeds said third radio measurement and said first radio measurement plus said hysteresis when said third radio measurement is less than or equal to said second radio measurement and said first radio measurement plus said hysteresis;
    access said communication system using said second system information associated with said second frequency when said second radio measurement exceeds said third radio measurement and said first radio measurement plus said hysteresis; and
    access said communication system using said first system information associated with said first frequency when said second radio measurement is less than or equal to said third radio measurement and said first radio measurement plus said hysteresis.

9. The apparatus as recited in claim 1 wherein said processing circuitry is further configured to:
    start a timer or a frequency counter in accordance with receiving said instruction;
    determine if said timer or said frequency counter is about to expire when said third frequency is not said final frequency under evaluation; and perform an analysis of a fourth frequency if said timer or said frequency counter is not about to expire.

10. The apparatus as recited in claim 1 wherein said processing circuitry is further configured to provide a log of said first radio measurement, said second radio measurement and/or said third radio measurement to a radio access node.

11. A method operable with an apparatus accessing a communication system using first system information associated with a first frequency providing a first radio measurement, comprising:
receiving an instruction to evaluate at least one frequency in accordance with a threshold and a hysteresis;
performing a second radio measurement over a second frequency (F2) without reading second system information associated with said second frequency (F2);
determining if said second radio measurement exceeds said threshold;
  accessing said communication system using said second system information associated with said second frequency when said second radio measurement exceeds said threshold;
  performing a third radio measurement over a third frequency when said second radio measurement is less than or equal to said threshold and without reading third system information associated with said third frequency;
determining if said third radio measurement exceeds said threshold;
  accessing said communication system using said third system information associated with said third frequency when said third radio measurement exceeds said threshold; and
determining if said third frequency is a final frequency under evaluation when said third radio measurement is less than or equal to said threshold;
  comparing said third radio measurement to said second radio measurement and said first radio measurement plus said hysteresis if said third frequency is said final frequency under evaluation.

12. The method as recited in claim 11 further comprising logging said first radio measurement and said second radio measurement.

13. The method as recited in claim 11 further comprising logging said third radio measurement.

14. The method as recited in claim 11, further comprising:
determining in accordance with said comparing if said third radio measurement exceeds said second radio measurement and said first radio measurement plus said hysteresis; and
accessing said communication system using said third system information associated with said third frequency when said third radio measurement exceeds said second radio measurement and said first radio measurement plus said hysteresis.

15. The method as recited in claim 14, further comprising:
determining if said second radio measurement exceeds said third radio measurement and said first radio measurement plus said hysteresis when said third radio measurement is less than or equal to said second radio measurement and said first radio measurement plus said hysteresis;
accessing said communication system using said second system information associated with said second frequency when said second radio measurement exceeds said third radio measurement and said first radio measurement plus said hysteresis; and
accessing said communication system using said first system information associated with said first frequency when said second radio measurement is less than or equal to said third radio measurement and said first radio measurement plus said hysteresis.

16. The method as recited in claim 11, further comprising:
starting a timer or a frequency counter in accordance with said receiving said instruction;
determining if said timer or said frequency counter is about to expire when said third frequency is not said final frequency under evaluation; and
comparing said third radio measurement to said second radio measurement and said first radio measurement plus said hysteresis if said timer or said frequency counter is about to expire.

17. The method as recited in claim 16, further comprising:
determining in accordance with said comparing if said third radio measurement exceeds said second radio measurement and said first radio measurement plus said hysteresis; and
accessing said communication system using said third system information associated with said third frequency when said third radio measurement exceeds said second radio measurement and said first radio measurement plus said hysteresis.

18. The method as recited in claim 17, further comprising:
determining if said second radio measurement exceeds said third radio measurement and said first radio measurement plus said hysteresis when said third radio measurement is less than or equal to said second radio measurement and said first radio measurement plus said hysteresis;
accessing said communication system using said second system information associated with said second frequency when said second radio measurement exceeds said third radio measurement and said first radio measurement plus said hysteresis; and
accessing said communication system using said first system information associated with said first frequency when said second radio measurement is less than or equal to said third radio measurement and said first radio measurement plus said hysteresis.

19. The method as recited in claim 11, further comprising:
starting a timer or a frequency counter in accordance with said receiving said instruction;
determining if said timer or said frequency counter is about to expire when said third frequency is not said final frequency under evaluation; and
performing an analysis of a fourth frequency if said timer or said frequency counter is not about to expire.

20. The method as recited in claim 11 further comprising providing a log of said first radio measurement, said second radio measurement and/or said third radio measurement to a radio access node.

* * * * *